United States Patent
Chang

(10) Patent No.: US 7,375,770 B2
(45) Date of Patent: May 20, 2008

(54) METHOD FOR LUMINANCE TRANSITION IMPROVEMENT

(75) Inventor: Fung-Jane Chang, Tainan County (TW)

(73) Assignee: Himax Technologies, Inc., Sinshih Township, Tainan County (TW)

(*) Notice: Subject to any disclaimer, the term of this patent is extended or adjusted under 35 U.S.C. 154(b) by 615 days.

(21) Appl. No.: 10/907,923

(22) Filed: Apr. 21, 2005

(65) Prior Publication Data

US 2006/0087692 A1 Apr. 27, 2006

(30) Foreign Application Priority Data

Oct. 22, 2004 (TW) .................. 93132196 A

(51) Int. Cl.
H04N 5/14 (2006.01)
H04N 5/21 (2006.01)
(52) U.S. Cl. .................. 348/671; 348/631
(58) Field of Classification Search .......... 348/671, 348/674, 675, 631; 382/237; 358/2.1, 3.01; H04N 5/14, H04N 5/21, 5/202, 9/69
See application file for complete search history.

(56) References Cited

U.S. PATENT DOCUMENTS 5,663,772 A * 9/1997 Uehara et al. .............. 348/671
5,777,590 A * 7/1998 Saxena et al. .............. 348/671
6,175,659 B1 1/2001 Huang
6,363,526 B1 3/2002 Vlahos
6,956,673 B2 * 10/2005 Ohshima .................. 358/3.01

FOREIGN PATENT DOCUMENTS

TW 350185 1/1990
TW 200404455 A 3/2004

* cited by examiner

Primary Examiner—Sherrie Hsia
(74) Attorney, Agent, or Firm—Winston Hsu

(57) ABSTRACT

A method for luminance transition improvement includes the following steps: inputting an image comprising a plurality of pixels comprising a first pixel; generating an extreme gray level according to the plurality of pixels; generating a first gray level difference according to the gray level of the first pixel and the extreme gray level; generating a first gray level adjustment value according to the first gray level difference, a first weighted value, a second weighted value, and a first order differential value of the gray level of the first pixel relative to a spatial coordinate; and generating an adjusted gray level of the first pixel according to the first gray level adjustment value and the gray level of the first pixel.

17 Claims, 6 Drawing Sheets

METHOD FOR LUMINANCE TRANSITION IMPROVEMENT

BACKGROUND OF INVENTION

1. Field of the Invention

The present invention relates to a method for luminance transition improvement, and more particularly, to a method of adjusting gray levels of pixels within an area having a large gray level variation for luminance transition improvement.

2. Description of the Prior Art

Please refer to FIG. 1. FIG. 1 is a diagram of an image 2 in the prior art. The image 2 includes a plurality of pixels 4 arranged in matrix form. The image 2 is composed of an image area 6 with specific features and a boundary area 8 around the image area 6.

A goal of image processing is to have the features of the boundary area 8 stand out while keeping the image area 6 and the surrounding boundary area 8 in harmony. An adjustment of the image parameters of the whole image 2 will sacrifice some features that are not within the image area 6 or cause distortion of the image area 6. The variation in luminance and spatial range within the boundary area 8 are small, so the blurred edges are obscure especially for the image 2 being enlarged. As the digital display technology progresses, such as digital TV, digital images need to be scaled up when being transferred to digital televisions in large size. There is a need to solve the problem of the blurred edges around the image area 6.

SUMMARY OF INVENTION

It is therefore a primary objective of the claimed invention to provide a method for luminance transition improvement for solving the above-mentioned problem.

According to claimed invention, a method for luminance transition improvement includes the following steps: inputting an image comprising a plurality of pixels comprising a first pixel; generating an extreme gray level according to the plurality of pixels; generating a first gray level difference according to the gray level of the first pixel and the extreme gray level; generating a first gray level adjustment value according to the first gray level difference, a first weighted value, a second weighted value, and a first order differential value of the gray level of the first pixel relative to a spatial coordinate; and generating an adjusted gray level of the first pixel according to the first gray level adjustment value and the gray level of the first pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
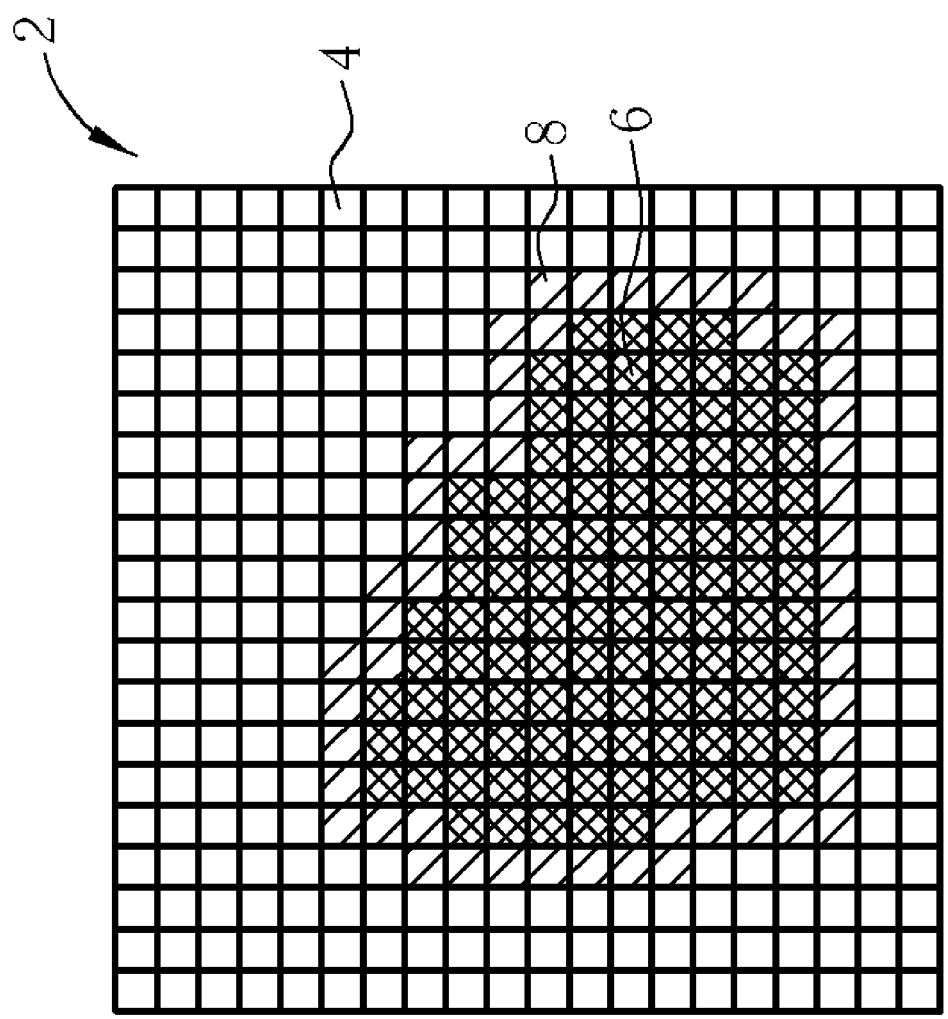
FIG. 1 is a diagram of an image in the prior art.
Figure 2:
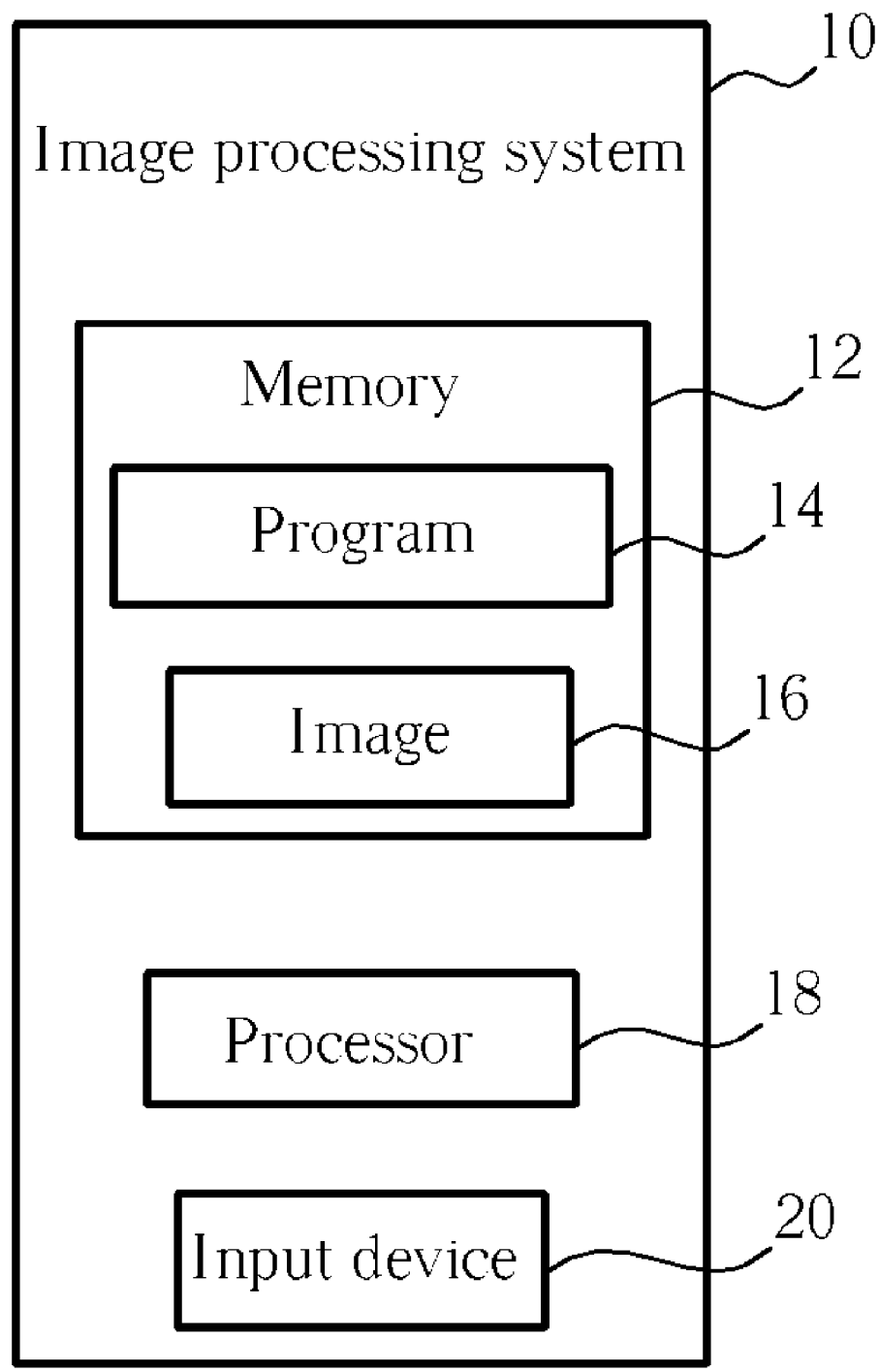
FIG. 2 is a block diagram illustrating an image processing system according to present invention.

Please refer to FIG. 2. FIG. 2 is a block diagram illustrating an image processing system 10 according to present invention. The image processing system 10 includes a memory 12 for storing a program 14 and an image 16 to be processed, a processor 18 for executing the program 14 stored in the memory 12, and an input device 20 for image parameter settings.

Figure 3:
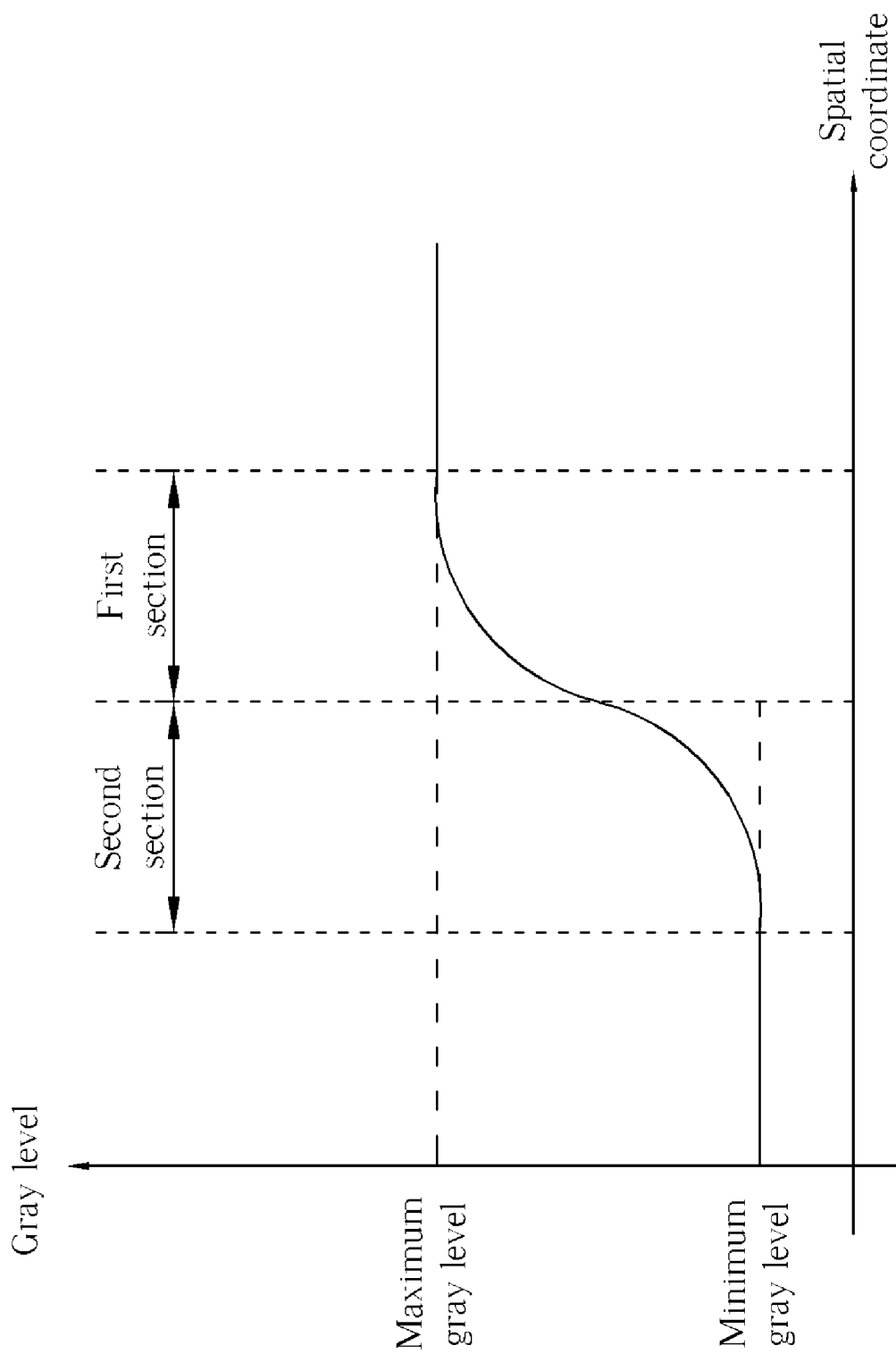
FIG. 3 is a distribution diagram illustrating gray levels of pixels of the image relative to a spatial coordinate.
Figure 4:
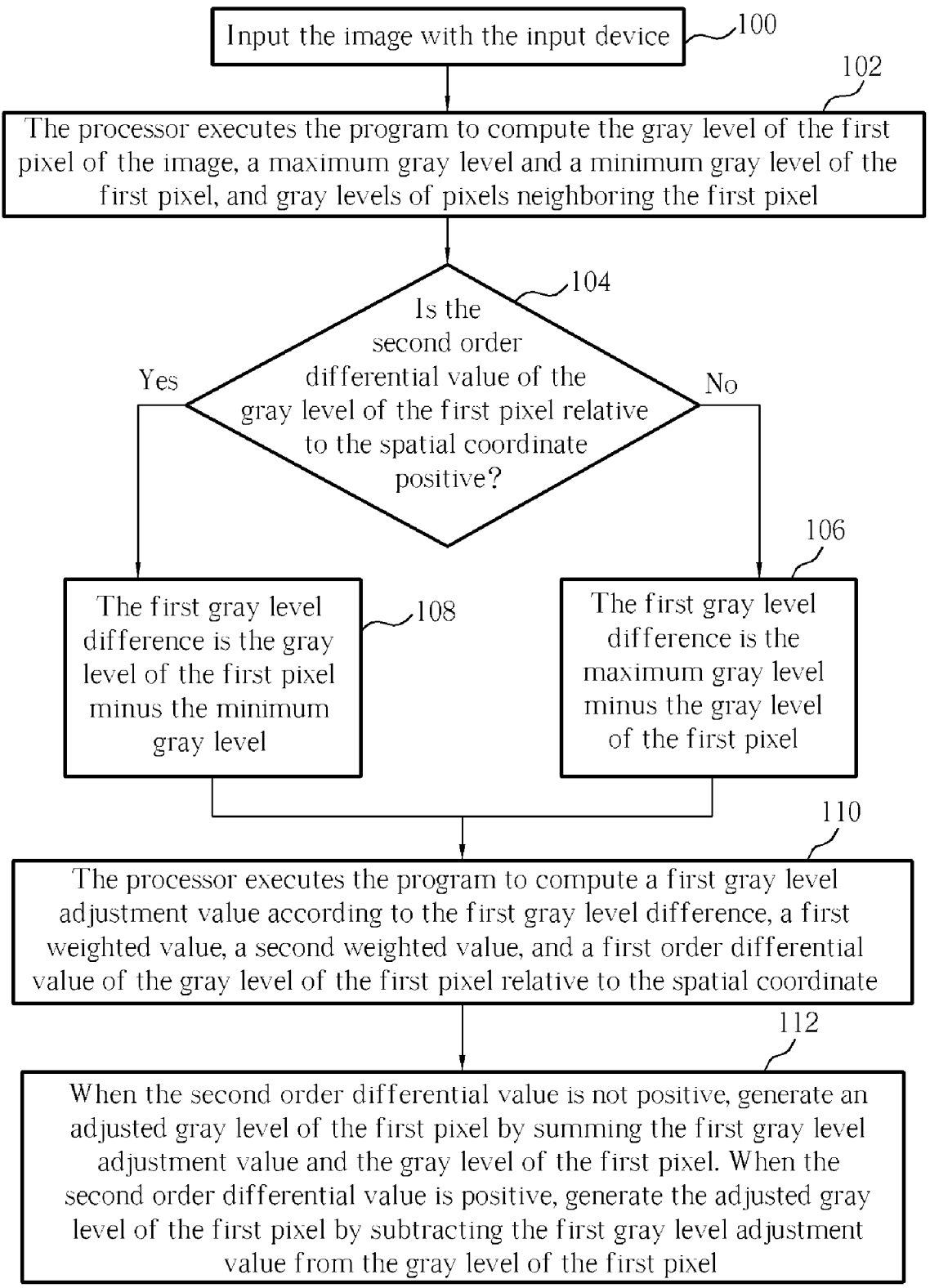
FIG. 4 is a flowchart illustrating luminance transition improvement according to the present invention.

Please refer to FIG. 3. FIG. 3 is a distribution diagram illustrating gray levels of pixels of the image 16 relative to a spatial coordinate. The abscissa of the distribution diagram is the spatial coordinate, such as the vertical or horizontal spatial coordinate of the image 16. The ordinate of the distribution diagram is the gray level. Please refer to FIG. 4. FIG. 4 is a flowchart illustrating luminance transition improvement according to the present invention. The method includes the following steps:

Step 100: Input the image 16 with the input device 20. The image 16 includes a plurality of pixels including a first pixel.

Step 102: The processor 18 executes the program 14 to compute the gray level of the first pixel of the image 16, a maximum gray level and a minimum gray level of the first pixel, and gray levels of pixels neighboring the first pixel.

Step 104: The processor 18 executes the program 14 to compute a second order differential value of the gray level of the first pixel relative to the spatial coordinate. When the second order differential value of the gray level of the first pixel relative to the spatial coordinate is not positive, go to Step 106; and when the second order differential value of the gray level of the first pixel relative to the spatial coordinate is positive, go to Step 108.

Step 106: The processor 18 executes the program 14 to compute a first gray level difference. The first gray level difference is the maximum gray level minus the gray level of the first pixel. Go to Step 110.

Step 108: The processor 18 executes the program 14 to compute a first gray level difference. The first gray level difference is the gray level of the first pixel minus the minimum gray level. Go to Step 110.

Step 110: Input a first weighted value and a second weighted value. The processor 18 executes the program 14 to compute a first gray level adjustment value according to the first gray level difference, the first weighted value, the second weighted value, and a first order differential value of the gray level of the first pixel relative to the spatial coordinate. Go to Step 112.

Step 112: The processor 18 executes the program 14. When the second order differential value of the gray level of the first pixel relative to the spatial coordinate is not positive, generate an adjusted gray level of the first pixel by summing the first gray level adjustment value and the gray level of the first pixel. When the second order differential value of the gray level of the first pixel relative to the spatial coordinate is positive, generate the adjusted gray level of the first pixel by subtracting the first gray level adjustment value from the gray level of the first pixel.

The detailed description is introduced as follows. First users can input the image 16 via the input device 20. If the first pixel is processed by the program 14, the pixels neighboring the first pixel will be processed so as to generate extreme gray levels of the first pixel and the pixels neighboring the first pixel. For example, if the left four pixels and right four pixels neighboring the first pixel at the spatial coordinate are considered, the maximum gray level and the minimum gray level of the nine gray levels of the nine pixels are the relative extreme gray levels of the image instead of the absolute extreme gray levels. And then the program 14 is capable of computing the second order differential value of the gray level of the first pixel relative to the spatial coordinate by any numerical methods. For example, the second order differential value of the gray level of the first pixel relative to the spatial coordinate can be (the sum of gray levels of two pixels neighboring the first pixel at the spatial coordinate)−2*(the gray level of the first pixel). Please refer to FIGS. 2 and 3. When the second order differential value of the gray level of the first pixel relative to the spatial coordinate is not positive, that is the first pixel is located on the curve in the negative-curvature at a first section, the first gray level difference is generated by subtracting the gray level of the first pixel from the maximum gray level. When the second order differential value of the gray level of the first pixel relative to the spatial coordinate is positive, that is the first pixel is located on the curve in the positive-curvature at a second section, the first gray level difference is generated by subtracting the minimum gray level from the gray level of the first pixel. Then users can input the first weighted value and the second weighted value via the input device 20, and the program 14 can compute the first gray level adjustment value as follows:

(the first gray level adjustment value)=(the first weighted value)*(the first order differential value of the gray level of the first pixel relative to the spatial coordinate)−(the second weighted value)*(the first gray level difference).

Figure 5:
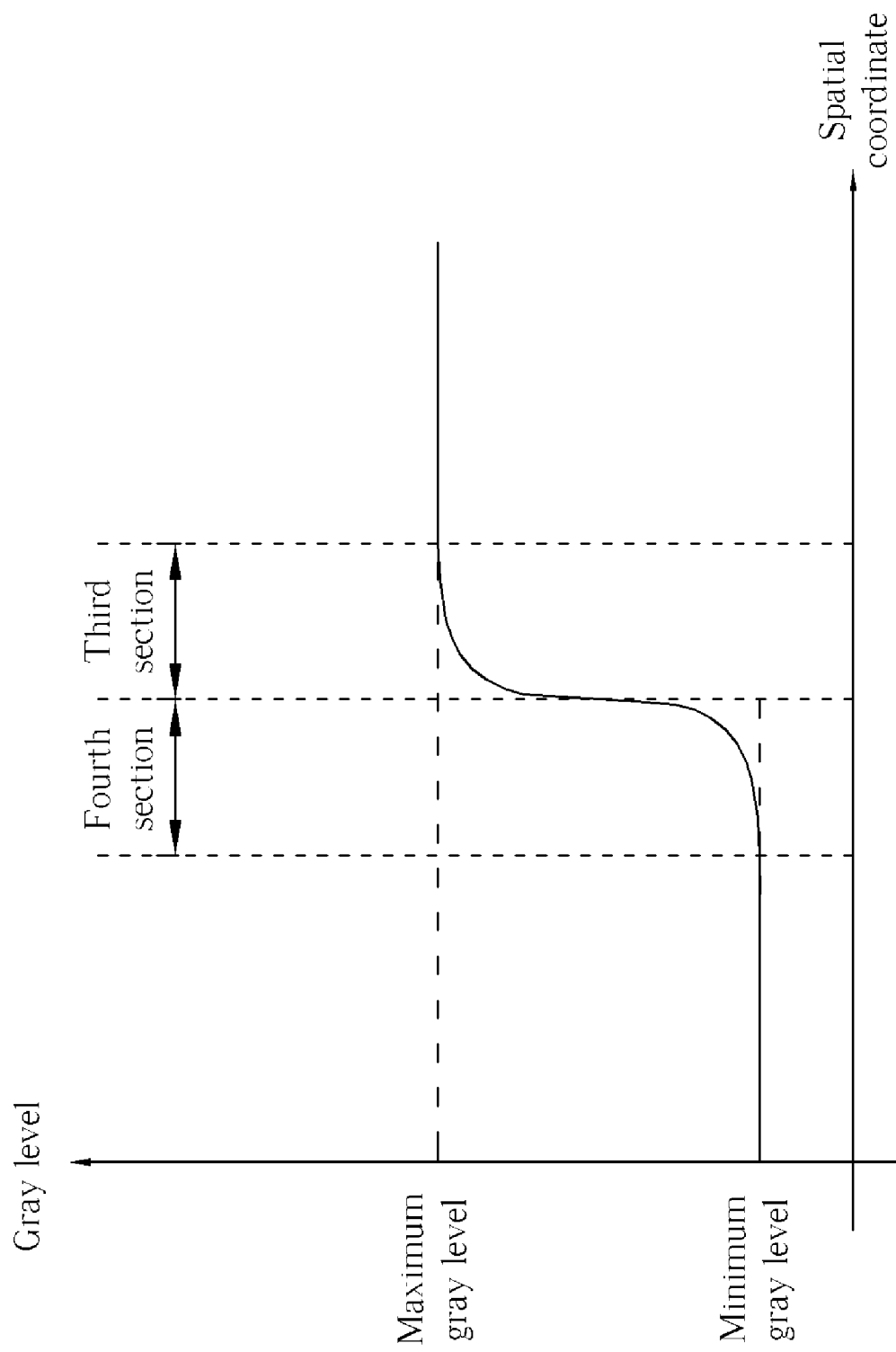
FIG. 5 is a distribution diagram illustrating the adjusted gray levels of pixels of the image relative to the spatial coordinate.

The first order differential value of the gray level of the first pixel relative to the spatial coordinate can be computed by any numerical methods. For example, the first order differential value of the gray level of the first pixel relative to the spatial coordinate can be (the absolute value of the difference of gray levels of two pixels neighboring the first pixel at the spatial coordinate)/2. The first weighted value and the second weighted value can be (1,0.25), (2,0.5), (2,0.25), and so on. When the second order differential value of the gray level of the first pixel relative to the spatial coordinate is not positive, the adjusted gray level of the first pixel is generated by summing the first gray level adjustment value and the gray level of the first pixel. When the second order differential value of the gray level of the first pixel relative to the spatial coordinate is positive, the adjusted gray level of the first pixel is generated by subtracting the first gray level adjustment value from the gray level of the first pixel. Any pixel of the image 16 can be processed with the method according to the present invention, especially those pixels having a large variation rate of the gray level to the spatial coordinate, such as the intersectional curve between the first section and the second section as shown in FIG. 3. Please refer to FIG. 5. FIG. 5 is a distribution diagram illustrating the adjusted gray levels of pixels of the image 16 relative to the spatial coordinate. As shown in FIG. 3 and FIG. 5, the width of a third section and a fourth section are less than the first section and the second section respectively. That is, the gray level transition area of the adjusted image 16 is narrower than the gray level transition area of the original image 16, and the variation rate of the gray level with the gray level transition area of the adjusted image 16 is larger than that of the original image 16 so that the blurred edges will be sharpened and clear.

Figure 6:
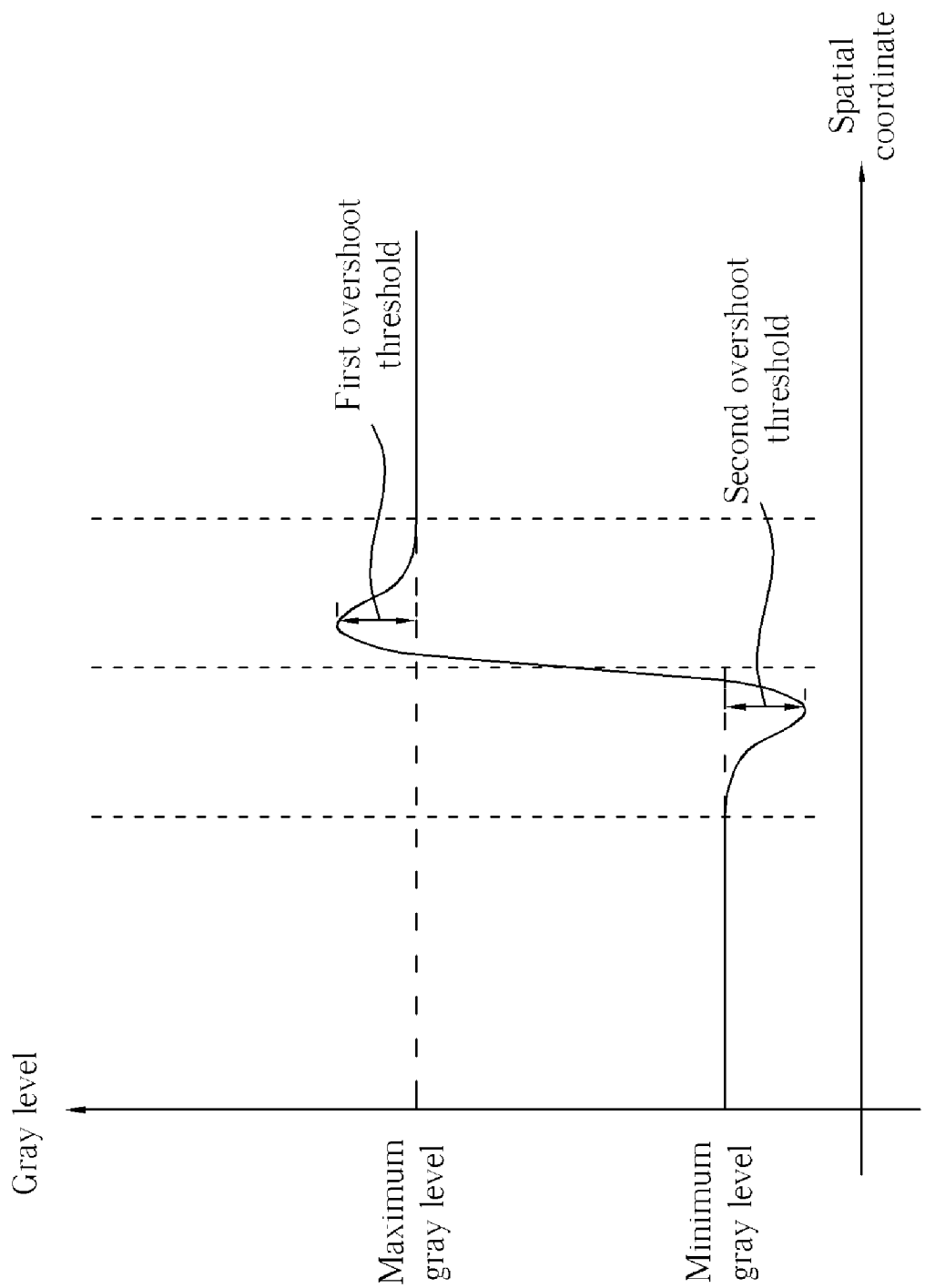
FIG. 6 is a distribution diagram illustrating setting a first overshoot threshold and a second overshoot threshold to the gray levels of pixels of the image relative to the spatial coordinate.

An overshoot threshold can be provided to limit the range of the adjusted gray level. Please refer to FIG. 6. FIG. 6 is a distribution diagram illustrating setting a first overshoot threshold and a second overshoot threshold to the gray levels of pixels of the image 16 relative to the spatial coordinate. When the second order differential value of the gray level of the first pixel relative to the spatial coordinate is not positive and the adjusted gray level of the first pixel is greater than the sum of the maximum gray level and the first overshoot threshold, the adjusted gray level of the first pixel can be set to the sum of the maximum gray level and the first overshoot threshold for preventing the adjusted gray level of the first pixel from being too large. When the second order differential value of the gray level of the first pixel relative to the spatial coordinate is positive and the adjusted gray level of the first pixel is less than the difference between the minimum gray level and the second overshoot threshold, the adjusted gray level of the first pixel can be set to the difference between the minimum gray level and the second overshoot threshold for preventing the adjusted gray level of the first pixel from being too small.

In contrast to the prior art, the method according to the present invention can adjust the gray level of pixels within an area having a large variation rate of the gray level to the spatial coordinate according to the variation rate of the gray level (the first order differential value of the gray level of the first pixel relative to the spatial coordinate) and the difference between a gray level of a pixel and relative extreme gray levels (the first gray level difference). Furthermore, for preventing the adjusted gray level of the pixel from being too large or too small, an overshoot threshold can be provided to limit the range of the adjusted gray level. The present invention can solve the problem of the blurred edges effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for luminance transition improvement comprising:
   (a) inputting an image comprising a plurality of pixels comprising a first pixel;
   (b) generating an extreme gray level according to the plurality of pixels;
   (c) generating a first gray level difference according to the gray level of the first pixel and the extreme gray level;
   (d) generating a first gray level adjustment value according to the first gray level difference, a first weighted value, a second weighted value, and a first order differential value of the gray level of the first pixel relative to a spatial coordinate; and
   (e) generating an adjusted gray level of the first pixel according to the first gray level adjustment value and the gray level of the first pixel.

2. The method of claim 1 further comprising detecting whether a second order differential value of the gray level of the first pixel relative to the spatial coordinate is positive.

3. The method of claim 2 wherein when the second order differential value of the gray level of the first pixel relative to the spatial coordinate is not positive, step (b) further comprises generating a maximum gray level according to the plurality of pixels and step (c) further comprises generating the first gray level difference according to the difference between the maximum gray level and the gray level of the first pixel.

4. The method of claim 3 further comprising providing a first overshoot threshold, wherein when the adjusted gray level of the first pixel is greater than the sum of the maximum gray level and the first overshoot threshold, the adjusted gray level of the first pixel is equal to the sum of the maximum gray level and the first overshoot threshold.

5. The method of claim 2 wherein when the second order differential value of the gray level of the first pixel relative to the spatial coordinate is not positive, step (e) further comprises generating the adjusted gray level of the first pixel according to the sum of the first gray level adjustment value and the gray level of the first pixel.

6. The method of claim 2 wherein when the second order differential value of the gray level of the first pixel relative to the spatial coordinate is positive, step (b) further comprises generating a minimum gray level according to the plurality of pixels and step (c) further comprises generating the first gray level difference according to the difference between the gray level of the first pixel and the minimum gray level.

7. The method of claim 6 further comprising providing a second overshoot threshold, wherein when the adjusted gray level of the first pixel is less than the difference between the minimum gray level and the second overshoot threshold, the adjusted gray level of the first pixel is equal to the difference between the minimum gray level and the second overshoot threshold.

8. The method of claim 2 wherein when the second order differential value of the gray level of the first pixel relative to the spatial coordinate is positive, step (e) further comprises generating the adjusted gray level of the first pixel according to the difference between the gray level of the first pixel and the first gray level adjustment value.

9. The method of claim 2 wherein the second order differential value of the gray level of the first pixel relative to the spatial coordinate is equal to:

(the sum of gray levels of two pixels neighboring the first pixel at the spatial coordinate)−2*(the gray level of the first pixel).

10. The method of claim 1 wherein the first gray level adjustment value is equal to:

(the first weighted value)*(the first order differential value of the gray level of the first pixel relative to the spatial coordinate)−(the second weighted value)*(the first gray level difference).

11. The method of claim 1 wherein the first order differential value of the gray level of the first pixel relative to the spatial coordinate is equal to:

(the absolute value of the difference of gray levels of two pixels neighboring the first pixel at the spatial coordinate)/2.

12. The method of claim 1 wherein the first weighted value and the second weighted value are (1,0.25).

13. The method of claim 1 wherein the first weighted value and the second weighted value are (2,0.5).

14. The method of claim 1 wherein the first weighted value and the second weighted value are (2,0.25).

15. The method of claim 1 wherein in step (d) the spatial coordinate is a vertical coordinate of the image.

16. The method of claim 1 wherein in step (d) the spatial coordinate is a horizontal coordinate of the image.

17. An image processing system for implementing the method of claim 1.

* * * * *